United States Patent
Krebs et al.

[15] 3,703,081
[45] Nov. 21, 1972

[54] GAS TURBINE ENGINE

[72] Inventors: James N. Krebs, Marblehead; Elmir E. Paulson, Topsfield, both of Mass.

[73] Assignee: General Electric Company

[22] Filed: Nov. 20, 1970

[21] Appl. No.: 91,286

[52] U.S. Cl. ............60/226 R, 60/39.08, 60/39.16 C, 60/39.36, 60/268, 415/65, 415/77, 415/218
[51] Int. Cl. ..............................F02k 3/06, F02c 7/06
[58] Field of Search ......60/226 R, 268, 39.08, 39.16, 60/39.36; 415/65, 218, 111, 77, 79, 181; 184/6.11; 308/187

[56] References Cited

UNITED STATES PATENTS

| | | | |
|---|---|---|---|
| 2,244,467 | 6/1941 | Lysholm | 60/39.32 |
| 2,416,389 | 2/1947 | Heppner | 60/39.16 C |
| 2,722,373 | 11/1955 | Ledwith | 415/218 |
| 3,088,278 | 5/1963 | Franz | 60/39.31 |
| 3,122,886 | 3/1964 | Davidovic | 60/39.16 R |
| 3,269,114 | 8/1966 | Marchant | 60/226 |
| 3,325,088 | 6/1967 | Keen | 60/39.08 |
| 3,390,527 | 7/1968 | Decher | 60/226 |
| 3,391,540 | 7/1968 | Bauger | 60/226 |
| 3,448,582 | 6/1969 | Bracey | 60/226 |
| 3,534,557 | 10/1970 | Petrie | 60/226 |
| 3,589,132 | 6/1971 | DuPont | 60/262 |

FOREIGN PATENTS OR APPLICATIONS

| | | | |
|---|---|---|---|
| 876,862 | 9/1961 | Great Britain | 184/6.11 |

*Primary Examiner*—Douglas Hart
*Attorney*—Derek P. Lawrence, Frank L. Neuhauser, Oscar B. Waddell, Joseph B. Forman and Edward S. Roman

[57] ABSTRACT

The disclosure shows two gas turbine engines particularly suited to propulsion of V/STOL aircraft. The engines are characterized by a short axial length relative to diameter which is attributable to several features. These features include, singly and in combination, a toroidal combustion chamber having a reversely folded combustion zone, a bearing system for counter-rotating engine rotors, a shell construction for a counter-rotating compressor, and a lubrication system employing a rotor shaft as the pumping element. Other related features are also described.

39 Claims, 7 Drawing Figures

PATENTED NOV 21 1972 3,703,081
SHEET 1 OF 5
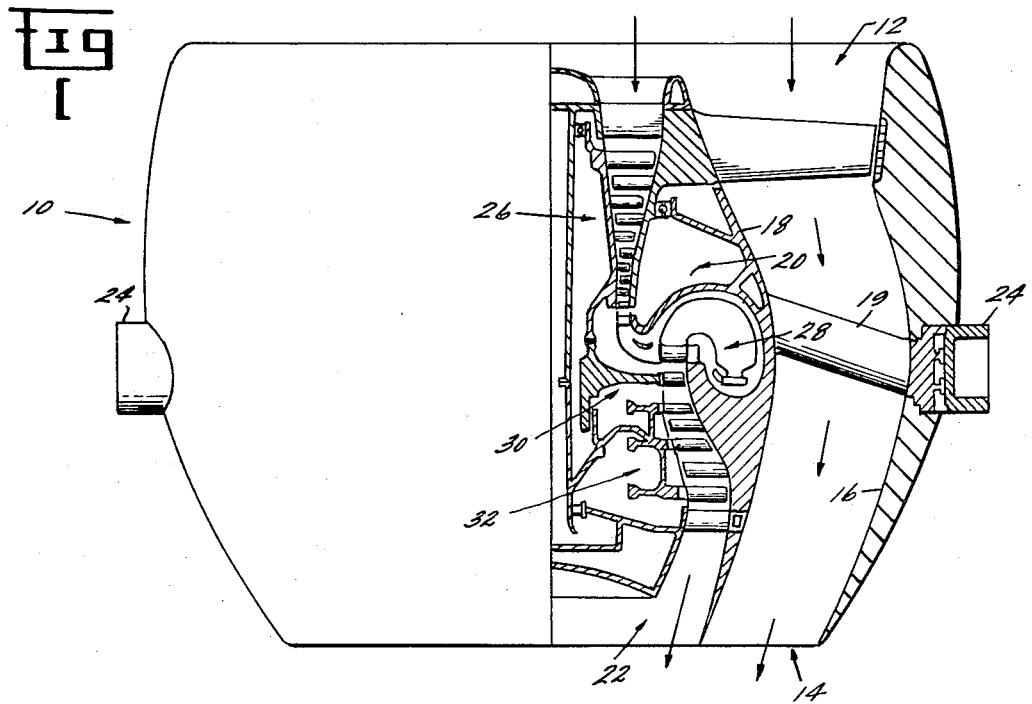
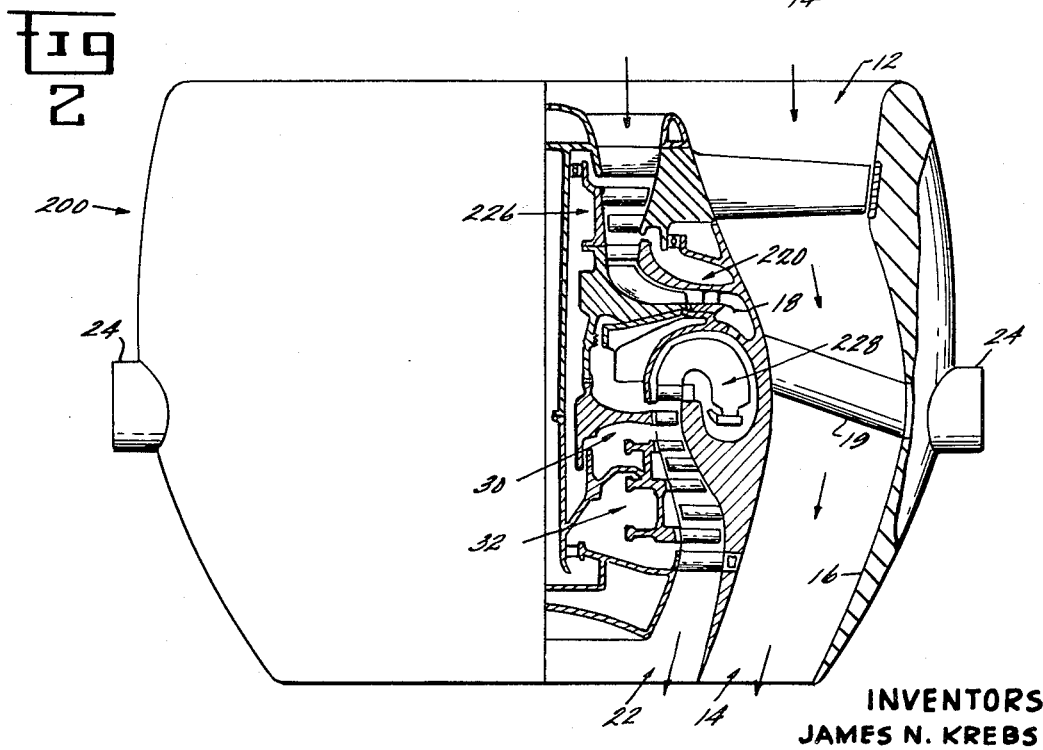
INVENTORS.
JAMES N. KREBS
ELMIR E. PAULSON
ATTORNEY—

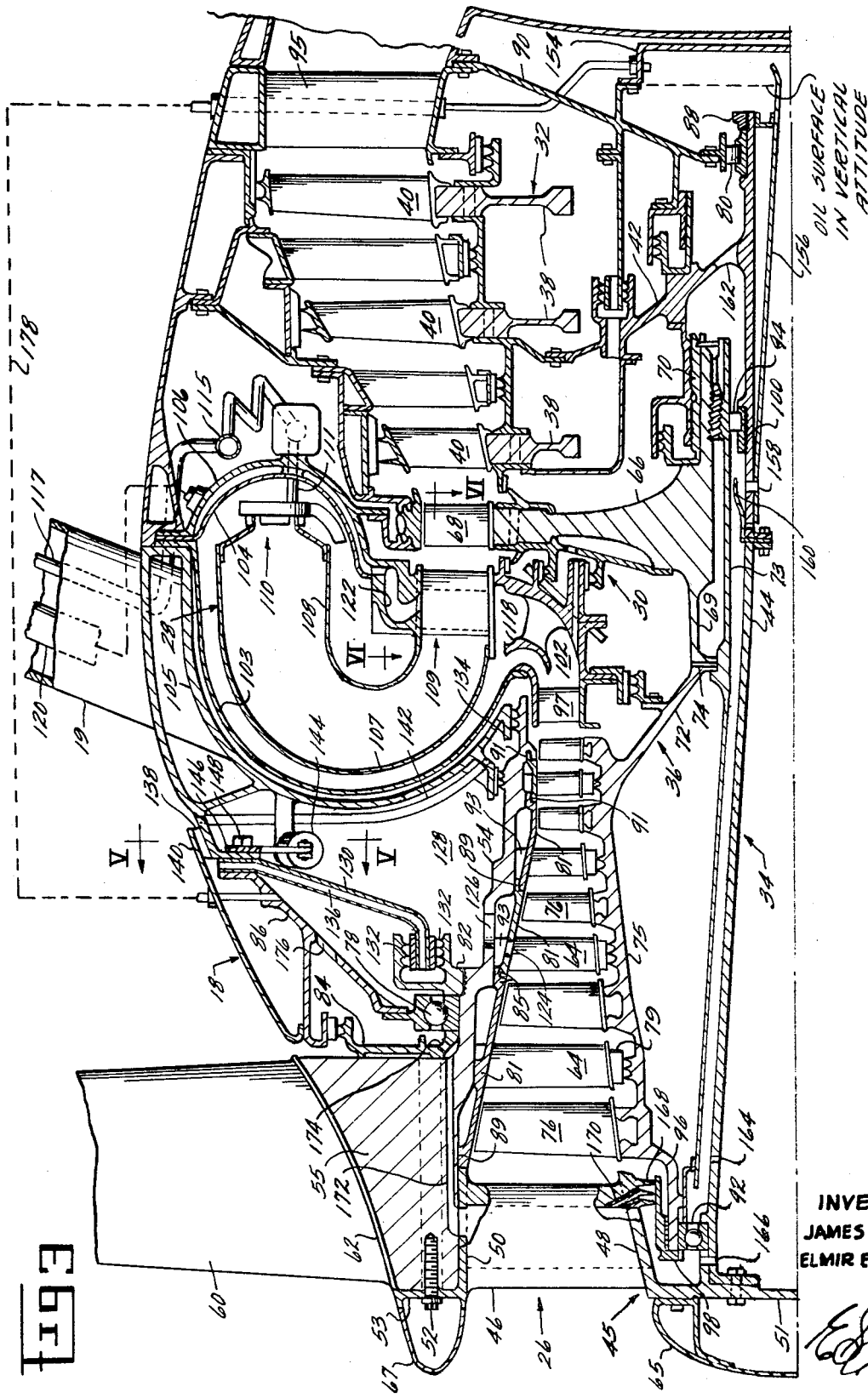

INVENTORS.
JAMES N. KREBS
ELMIR E. PAULSON

ATTORNEY

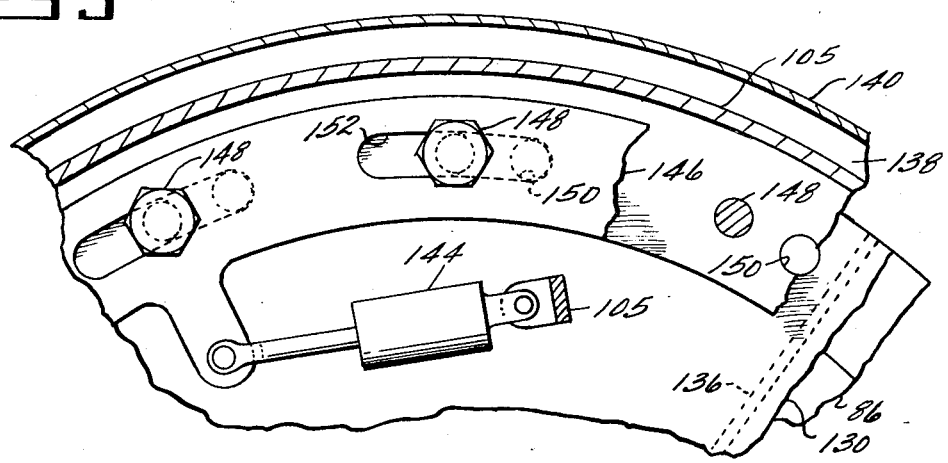
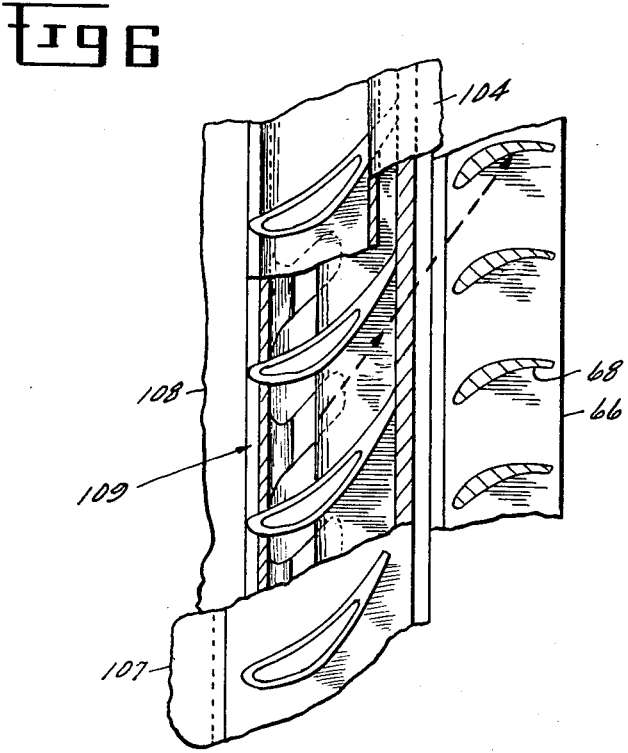
INVENTORS.
JAMES N. KREBS
ELMIR E. PAULSON
ATTORNEY

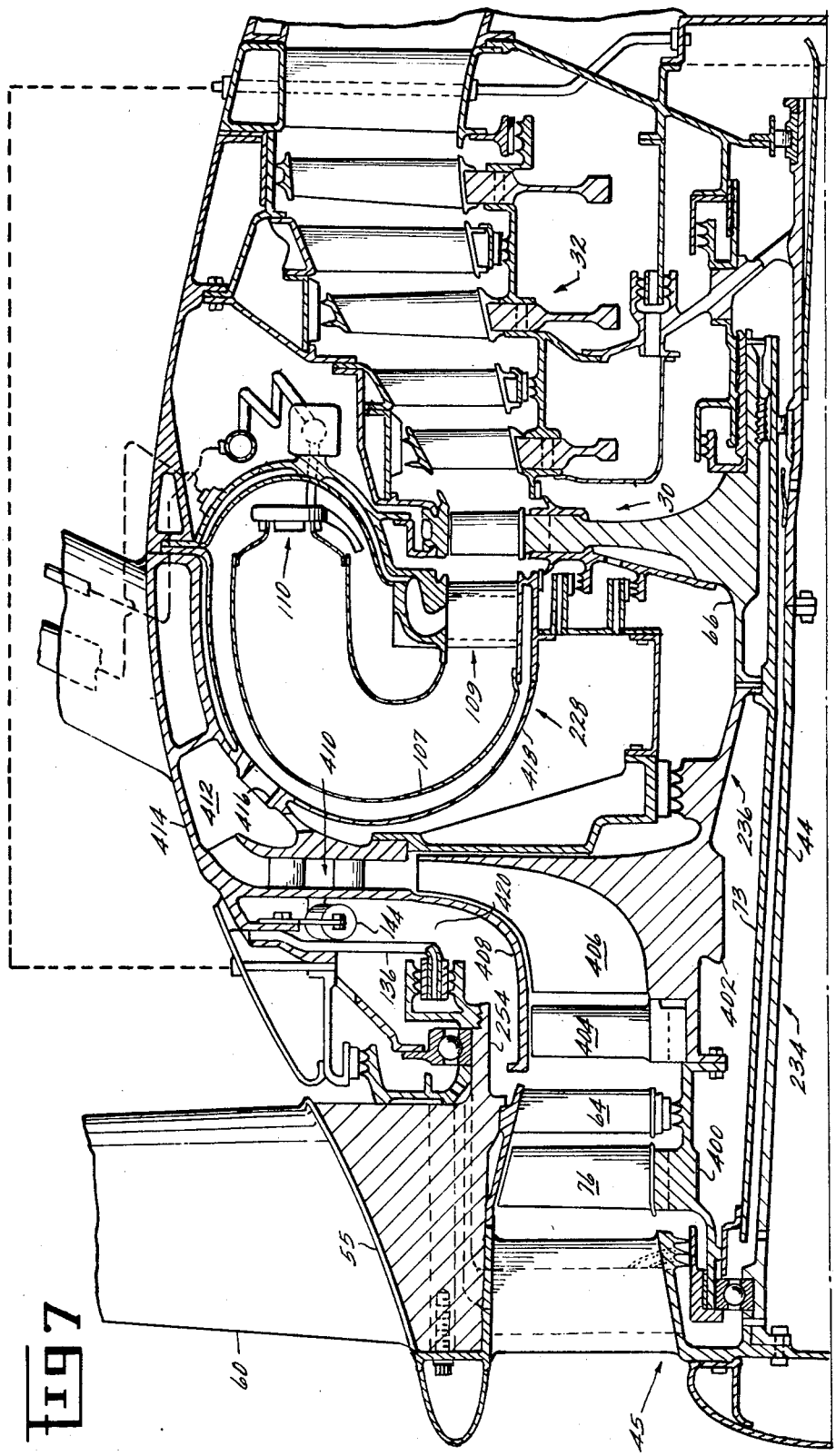

GAS TURBINE ENGINE

The present invention relates to improvements in gas turbine engines and, in certain aspects thereof, more particularly to fan type engines employed in the propulsion of aircraft and, in other aspects, to engines providing thrust for V/STOL aircraft.

Many proposals have been made for aircraft systems having V/STOL (vertical or short take-off and land) capabilities. One of the most promising approaches is to employ separate engines for vertical and forward propulsions. The engines for forward propulsion are mounted in a more or less conventional fashion, while the engines providing vertical thrust are desirably mounted in pods, set off from the fuselage of the aircraft. Other mounting arrangements may also be employed.

While the pod approach provides many advantages to the overall propulsion system, it introduces a drag penalty in forward flight. This drag is a function of the pod area which, in turn, is a function of the dimensional envelope of the engine or engines mounted in the pod. Since the diametrical dimension of the engine is determined, to a large part, by the desired thrust, the axial length of the engine becomes of paramount importance in reducing installed drag.

In addition to the requirement for a short axial length there is also the more readily recognized requirement of a high thrust-to-weight ratio. The weight factor also involves the mounting pod, i.e. reduced engine length reduces the pod height and consequently its weight.

Accordingly, one object of the invention is to provide an engine particularly suited for V/STOL propulsion and having, for a given thrust, a minimum axial length and thus a minimum installed height.

To this end a fan engine, including a casing and an inner housing defining a fan duct, of the present invention is characterized by a core gas generator, within the inner housing, including a compressor, a generally toroidal combustion chamber and turbine means for powering the compressor and fan blading. The toroidal combustion chamber is further characterized by a turbine nozzle diaphragm outlet having annular liners curved from its shrouds, through 180° to a forward facing air/fuel inlet, thus defining a folded combustion zone. The turbine means may be further characterized by an annular flow-path which diverges relatively sharply to a diameter approaching the maximum diameter of the toroidal combustion chamber. Further, it is preferred to provide means for directing at least a portion of the compressor discharge air through hollow vanes of the turbine nozzle diaphragm before it enters the combustion zone. This provides a highly effective cooling system for this component.

While the broader features of the invention are applicable to fan engines including core gas generators employing both axial, centrifugal and combined axi-centrifugal compressors, it is preferred in accordance with certain aspects of the invention, to employ an axial flow compressor. In one preferred arrangement, the gas generator employs a constant pitch diameter compressor which is provided with an outwardly curved, annular diffuser for discharging pressurized air into the toroidal combustion chamber intermediate its axial length.

Another preferred feature of the invention is in the use of a counter-rotating compressor for the core gas generator. Two engine rotors are employed, each having compressor and turbine sections. The compressor section of one rotor comprises a drum having circumferential rows of outwardly projecting blades. The compressor section of the other rotor comprises a rotating casing or shell having circumferential rows of inwardly projecting blades which cooperate with the blades of the other rotor to pressurize the air. The fan blades then project outwardly from the rotating shell.

Counter-rotating compressors and engines employing counter-rotating rotors are not new per se. However, their mounting and fabrication have been relatively complex and in many instances in the prior patent are not refined to the point of practical application.

Accordingly, another object of the invention is to provide improved mounting means for two rotor engines in general and adapted specifically to meet the requirements of short axial length engines intended for use in V/STOL propulsion.

Another object of the invention is to provide a counter-rotating compressor which has high strength and may be readily assembled and disassembled and, additionally, to accomplish this end with a construction enhancing the ends of the previously stated objects of the invention.

These ends are achieved in a core engine or any gas turbine engine comprising two counter-rotating rotors each having turbine and compressor sections. The compressor section of one rotor includes a drum having circumferential rows of outwardly projecting blades. The compressor section of the other rotor includes a casing or shell having circumferential rows of inwardly projecting blades which cooperate with the blades of the first rotor to pressurize air. The upstream ends of the shell and an inner shaft are connected by a vaned torque ring. The inner shaft is connected with the turbine section of the other rotor. The outer diameter of the shell and the downstream end of the other rotor are journaled on the housing of the engine while the one rotor is journaled on the inner shaft of the other rotor.

Other features are found in a counter-rotating compressor having a circumferentially integral shell or outer casing and at least one row of inwardly projecting blades joined to circumferential outer shrouds formed in sectors no greater than about 180°. The blade sectors may be assembled from the sides of the drum of a second rotor having circumferential rows of outwardly projecting blades between which the sectored rows are interdigitated. The outer shell is then telescoped over the blade rows and a vaned torque ring, connecting with an inner shaft, secured thereto to complete the assembly. Such an assembly is particularly effective in a compressor having a converging outer flow-path as in a preferred arrangement of the present invention where the compressor discharge is radially outward into a toroidal combustion chamber. In such case, the turbine section for driving the drum is separable for assembly subsequent to assembly of the rotating compressor casing.

Another problem associated with counter-rotating compressors is avoiding compressor stall at off-design condition. That is, a compressor is aerodynamically designed for operation at given rotor speeds and other set operating parameters. When these parameters change, rotor speed in particular, there is a tendency for the well-known phenomenon of stall to occur. It is known that selectively bleeding of air from the compressor can prevent this stall situation. However, isolation of the bleed system remains a problem in many engine configurations.

Another object of the present invention is to apply bleed air control of stall to the engine of the present invention and, more broadly, to other engines where maintaining proper venting of the seal areas is a similar problem.

In meeting the requirements of V/STOL propulsion, it has been discovered in accordance with another object of the invention that weight and complexity of the lubrication can be reduced in a simple and highly effective manner.

To this last end, one rotor of a two rotor, vertically disposed engine is provided with a tapered shaft that extends into a sump secured to a lower frame member. The taper of the shaft pumps the oil upwardly along its length when the shaft is rotating. Passageways in the shaft direct the oil to bearings that require lubrication. The oil is then returned to the sump by gravity.

The above and other related objects and features of the invention will be apparent from a reading of the following description of the disclosure found in the accompanying drawings and the novelty thereof pointed out in the appended claims.

In the drawings:

FIG. 1 is a simplified illustration, partly in section, of a gas turbine engine embodying the present invention;

FIG. 2 is a simplified illustration, partly in section, of a second gas turbine engine which embodies the present invention;

FIG. 3 is a longitudinal half-section, in greater detail, of the gas generator portion of the engine seen in FIG. 1;

FIG. 5 is a section taken on line V—V in FIG. 3;

FIG. 6 is a section taken on line VI—VI in FIG. 3; and

FIG. 7 is a longitudinal half-section, in greater detail, of the gas generator portion of the engine seen in FIG. 2.

Figure 4:
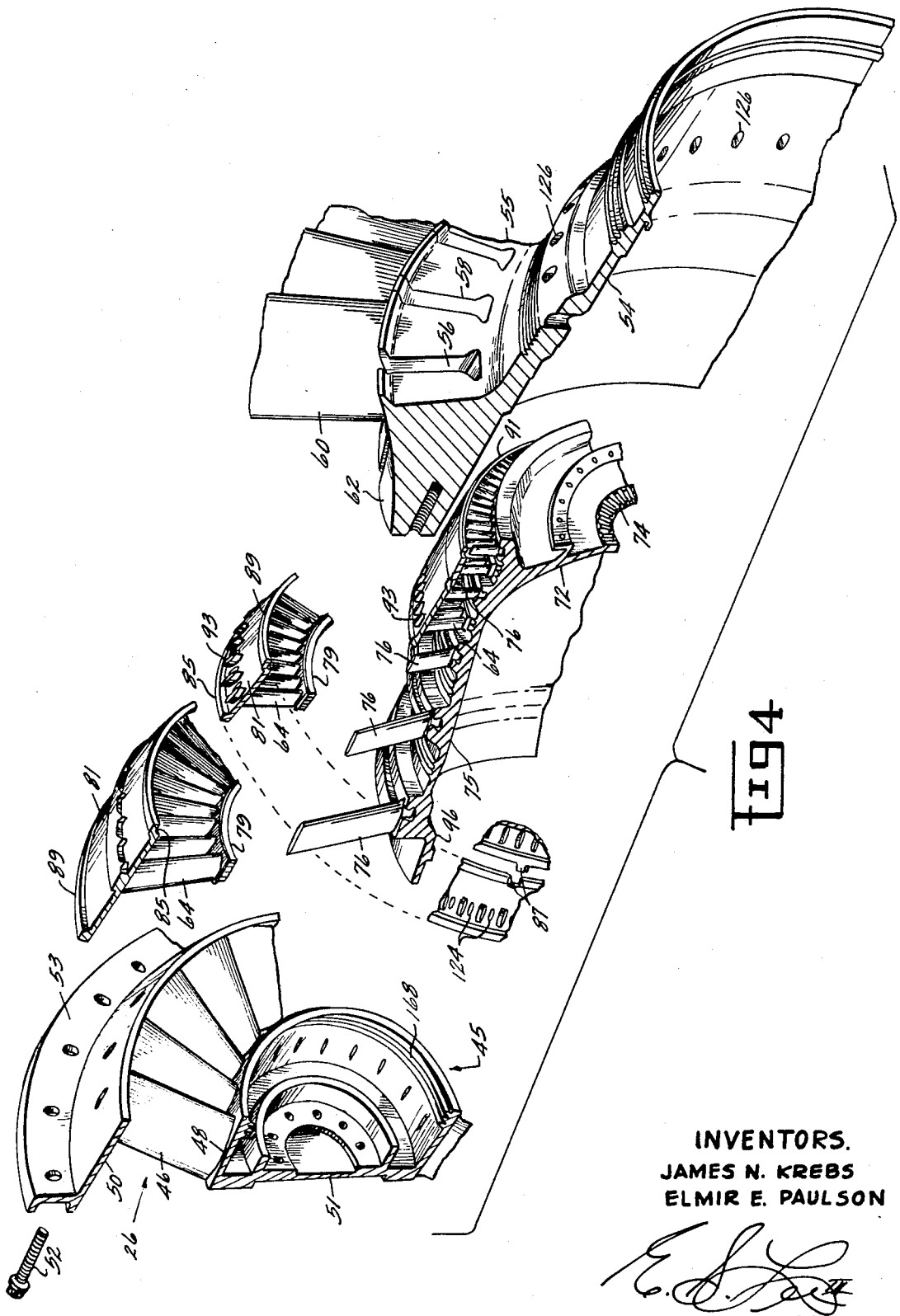
FIG. 4 is a perspective, exploded view of compressor components seen in FIG. 3.

The engine 10 is shown in FIG. 1 as it would be deployed to provide vertical thrust for a V/STOL aircraft. The engine 10 is of the fan type wherein a relatively low energy, high mass flow air stream is pressurized by a fan 12 and discharged from an annular nozzle 14 to provide a propulsive force. The nozzle 14 is formed at the downstream ends of an outer casing 16 and an inner housing 18. The inner housing 18 is connected to and supported from the outer casing 16 by struts 19 which function as outlet guide vanes for the fan 12. A core engine or gas generator 20, within the housing 18, generates a high energy, hot gas stream which powers the fan 12 and generates a further propulsive force by being discharged from a nozzle 22 at the downstream end of the housing 18.

The casing 16 may be provided with trunnions 24 so that the engine can be pivoted relative to the airframe of the aircraft. Thus, the engine's thrust may be vectored in transitioning between vertical and horizontal flight modes.

The gas generator 20 comprises a high pressure compressor 26, which pressurizes air to support combustion of fuel in a combustion chamber 28. The hot gas stream thus generated then drives a high pressure turbine 30 and a low pressure turbine 32 before being discharged from the nozzle 22. The turbines 30 and 32 power the high pressure compressor 26 and fan 12 as will later appear.

Referencing FIG. 3, the engine 10 comprises two counter-rotating rotors 34 and 36 having their upper, or upstream ends at the left hand side of the figure. Rotor 34 is a relatively low speed rotor including three discs 38 having radially projecting blades 40 which form the rotating portion of the low pressure turbine 32. These discs are joined to a torque cone 42 which extends from the lower end portion of an inner shaft 44. The shaft 44 is bolted at its upper end to a torque ring 45 (See also FIG. 4) comprising a circumferential row of blades 46 which are integrally joined at their inner and outer ends respectively to shrouds 48 and 50 and an end closure 51 for the shroud 48. The outer shroud 50 has a flange 53 which is secured by bolts 52 to the rim portion 55 of a structural shell 54. The rim portion 55 has dovetail grooves 56 which receive tangs 58 (See FIG. 4) formed at the inner ends of blades 60, the latter comprising the fan 12. Platforms 62 formed optionally on the rim portion 55 or the blades 60, extend between adjacent blades to define the inner bounds of the air flow-path through the fan rotor which flow-path progressively increases in diameter. The shell 54 also carries a plurality of axially spaced rows of inwardly projecting blades 64 which form a part of the gas generator compressor 26. A spinner 65 is secured to the end closure 50 to aerodynamically define the inner bounds of the inlet to the core engine 20. An annular splitter 67 is secured to the flange 53 to aerodynamically define the outer bounds of the core engine inlet and inner bounds of the fan inlet.

The rotor 36 is a relatively high speed rotor including a disc 66 having radially projecting blades 68 which form the rotating portion of the high pressure turbine 30. The disc 66 has hollow stub shafts 69, 70 projecting in opposite directions from its bore. The stub shaft 69 is connected to a conical shaft 72 by a toothed or curvic coupling indicated at 74. This coupling is held in engagement by a flanged sleeve 73 threadably engaged with the stub shaft 70. The conical shaft 72 extends to a tapered shell 75 on which are mounted circumferential rows of outwardly projecting blades 76. The rows of blades 76 project between the rows of blades 64 to form a counter-rotating compressor which shortens the axial length required for a given pressure rise.

Going into further detail on the construction of the rotors 34 and 36 and particularly the portions forming the high pressure compressor 26, reference will again be made to FIG. 4. Rotation of the inwardly projecting blades 64 generates substantial, radial centrifugal force loadings which must be carried into a hoop structure as is provided by the shell 54. To assure this capability with minimum weight, the shell is integrally formed as a hoop structure, i.e., without a longitudinal split line.

The problems of assembling the compressor 26, absent such a split, are overcome in the fashion now described. Each row of blades 64 is formed in sectors with each sector preferably having an angular extent of 180°. Each segment further comprises inner and outer shrouds 79 and 81. The outer shrouds 81 variously have shroud extentions which compositely form the outer bounds of the high pressure compressor flow-path.

In assembly, the blades 76 are first mounted on the rotor shell 75. Next, the sectors of the downstream row of blades 64 are positioned between the last two rows of blades 76 and temporarily held in that position. The sectors of the next upstream row of blades 64 are then brought in from the sides with their circumferential splits offset from those of the assembled blade row. The shrouds 81 (or their extensions) of the two blade rows have diametrical locating surfaces 83 which are telescoped to lock the two blade rows together. These shrouds (or their extensions) also have abutting surfaces 85 to provide positive relative axial positioning and interdigitating surfaces 87 to prevent relative angular movement. The succeeding upstream rows are then assembled in similar fashion. It will be apparent that there is no mandatory order in which the rows of blades 64 must be assembled.

With the rows of blades 64 thus assembled, the shell 54 is telescoped, from the rear, to the position illustrated in FIG. 3. The shrouds 81 have circumferential locating surfaces 89 which position the blade rows 64 concentrically of the shell 54. The rearmost shroud 81 also has a lip 91 which is received in a corresponding groove in the shell 54 to provide for axial positioning of the blade rows 64 relative to the shell 54. The next step is to mount torque ring 45, telescoping it to the position illustrated in FIG. 3, from the front of the partial rotor assembly. When the bolts 52 are tightened, the blade rows are positively locked in place as the shroud 50 engages the shroud extension 81 of the leading row of blades 64. It will be noted that the described construction provides an outer flow-path for the compressor 26 which is convergently tapered for reasons that later appear. Nonetheless, the circumferential positioning surfaces are, with the illustrated stepped construction, cylindrical so that there is freedom of axial movement to position the blade rows against radial, abutting surfaces. This gives greater accuracy in assembly. It will also be noted that extensions 93 project from the outer surfaces of the shrouds 81 to engage cylindrical inner surfaces of the shell 54 and thereby further distribute the stress loadings in the shell while minimizing the stress loadings in the shrouds 81.

One point to note is that the split between the compressor and turbine portions of the rotors 34 and 36 permits the described assembly of the compressor while at the same time permitting a turbine flow-path having a diameter greater than that of the compressor discharge. After the described assembly of the compressor, the turbine portions of these rotors may be assembled as illustrated in FIG. 3 as will be apparent to those skilled in the art.

The rotor 34 (FIG. 3) is journaled on the inner housing 18 by bearings 78 and 80. The inner race of ball bearing 78 is clamped on an outer diameter of the shell 54, adjacent the rim portion 55, by a nut 82 which forces the inner race against a retainer 84 for the blades 60. The outer race of bearing 78 is secured to an annular strut 86 within the housing 18. The inner race of roller bearing 80 is clamped on the lower end of the shaft 44 by a nut 88 while its outer race is secured to a frame member 90. The latter is secured to a circumferential row of turbine outlet guide vanes 95 which function as structural members to carry the bearing (80) loads into the frame structure of the inner housing 18.

The high speed rotor 36 is journaled, by bearings 92 and 94, on the low speed rotor 34. The inner race of ball bearing 92 is clamped against a shoulder on the upper end of shaft 44 by the torque ring 45 and its outer race is clamped on a stub shaft 96, projecting from the compressor rotor shell 75, by a nut 98. The inner race of roller bearing 94 is clamped on the shaft 44 by a nut 100. The sleeve 73 serves as the outer race of the bearing 94.

It will be noted that the shaft 44 is split intermediate its length. The upper portion half is divergently tapered, for reasons that later appear, while the lower portion is essentially cylindrical and is formed integrally with the turbine torque cone 42. Here again are features lending to ease of assembly. Thus, the bearing 92 may be locked on the stub shaft 96 after it has been telescoped over the upper portion of the shaft 44. This would be done before mounting the torque ring 45 as previously described.

Air pressurized by the high pressure compressor 26 is discharged through a cascade of fixed outlet guide vanes 97 to a curved, outwardly directed, annular diffuser 102. The diffuser opens centrally into the generally toroidal combustion chamber 28 intermediate its length, axially of the engine. The toroidal combustion chamber 28 is primarily defined by casings 103, 104 having flanges clamped between inner housing frame members 105, 106 which have wall portions spaced from the respective casing members. Casing 103 also provides structural support for the compressor outlet guide vanes 95 and sealing and cooling structure connected thereto.

Within the toroidal chamber 28 are curved, annular liners 107, 108 which define a folded combustion chamber having a curvature of 180°. The liners 107, 108 curve forwardly and outwardly, respectively, from the inner and outer shrouds of a turbine nozzle diaphragm 109 to form this combustion zone. At the outer end of the combustion zone is a forwardly facing inlet for the pressurized combustion air and fuel. Fuel injectors 110 are spaced around this outer inlet end which also has holes for the admission of pressurized combustion air. The injectors 110 are preferably of the low pressure, carburizing type as illustrated in copending application Ser. No. 816,985, filed Apr. 4, 1969, and of common assignment with the present application. Fuel for these injectors is provided by respective conduits 111 from a manifold 115. The manifold 115 is supplied with pressurized fuel by way of a conduit 117 which extends through one of the struts 19 that is aligned with a trunnion 24. This permits the fuel controls to be mounted outside the inner housing 18.

It will be seen that the liner wall 107 is spaced from the casing 103 to provide an air passageway and that an annular splitter 118 assists in directing a portion of the compressor discharge air into this curved, annular passageway. The remainder of the compressor discharge air passes through hollow vanes of the diaphragm 109 and then along the inner liner 108

(which is likewise spaced from the casing 104), to also enter the inlet end of the combustion zone. It will be appreciated that pressurized air may pass through openings (not shown) formed along the lengths of the liners 107 and 108 to enter the combustion zone as secondary air and liner cooling air. It will also be noted that the air passing through the hollow vanes of the diaphragm 109 serves to cool these vanes. This cooling effect is gained without bleeding air from the hot gas stream to a lower pressure thus enhancing the overall efficiency also FIG. 6) formed in the of the engine cycle. The hot gas stream generated in the combustion zone is discharged from the diaphragm 109 to properly impinge the blades 68 of the high pressure turbine disc. Since the engine rotors are counter-rotating it is not necessary (though it may be desirable in certain instances) to provide a nozzle diaphragm between the high pressure and low pressure turbines, thus further minimizing the overall length of the engine. Nozzle diaphragms 112 are mounted on the housing 18 to properly direct the gas stream toward the second and third stages of the low pressure turbine 32.

The space between casing 104 and frame 106, in addition to being a heat shield, also serves as a passageway for starting air. Pressurized starting air is introduced, from an external source, by way of a conduit 120 which extends through one of the trunnions 24 and aligned struts 19, for convenience illustrated as the same strut through which the fuel conduit 117 passes. This casing passageway then leads to a selected number of passageways 122 (See also FIG. 6) formed in the outer shroud 123 of the diaphragm 109. The passageways 122 direct the pressurized air to the turbines 30 and 32 to provide sufficient rotor speed for the compressor discharge pressure and volume to be sufficient to sustain engine operation when fuel is introduced into the combustion zone and ignited (in known fashion) during start up.

When operating at other than the design point (set inlet temperature and pressure, rotor speeds, etc.), it may be necessary to bleed air from an intermediate stage of the high pressure compressor 26 in order to avoid a stall condition. To this end openings 124 and 126 are formed in the shroud 81 and structural shell 54 which allow a surrounding chamber 128 to be pressurized. The chamber 128 is defined by the stationary frame 105 and an annular disc 130, and the rotating shell 54. The disc 130 is clamped between flanges formed on the frame 105 and the bearing support frame 86. Rotating pairs of fluid seals 132, 134 are provided between the shell 54 and the disc 130 and frame 105 respectively. The chamber intermediate the pair of seals 132 is vented to the lower fan steam pressure by passageways 136 extending through the disc 130 and an opening 138 between a skin portion 140 of the housing 18 and the frame 105. The chamber intermediate the pair of seals 134 is vented to the fan duct by a plurality of tubes 142 which open to the exterior of the housing 18. This seal arrangement effectively isolates the chamber 128 from adjacent pressure zones particularly when the chamber 128 is not vented. This is of particular significance with respect to the seals 134 which seal the chamber 128 from compressor discharge pressure.

Venting and sealing of the chamber 128 is controlled by actuators 144, each attached at one end to the frame 105 and at its other end to a ring 146. The ring 146 is slidable against the flange of the frame 105 being positioned thereon by shoulder bolts 148 which also clamp the bearing support frame 86 and disc 130 to the frame 105. Outlet ports 150, through frames 86 and 105 and the disc 130 are sealed off during design point operation of the engine by the ring 146. The ring 146 is provided with arcuate slots 152 which permit the ring to be rotated, by actuators 144, and bring such slots into register with the ports 150 when compressor bleed is required during off-design operation. The bleed air passes through the ports 150 and is discharged into the fan stream.

The lubrication system for the engine 10 is uniquely adapted for V/STOL operation where the engine is mounted in a more or less vertical attitude as illustrated and described in connection with FIG. 1. An oil sump 154 is secured to the lower end of the inner frame member 90. A tapered extension 156 of the shaft 44 projects into the sump 154, below the level of the oil therein. It will be noted that the lower portion of the shaft 44 is formed cylindrically to facilitate assembly with the bearings 94 and 80. The tapered extension 156 in combination with the tapered upper portion of the shaft 44 provides a pumping clement. Oil flows upwardly along this tapered element, due to centrifugal force, when the shaft 44 is rotating during engine operation. The degree of taper is balanced against the rate of rotation and the properties of the oil to flow a desired amount of oil upwardly to delivery ports which direct the oil from the shaft toward the bearings of the engine.

A portion of the oil pumped upwardly passes through holes or ports 158 and is deflected, by a shield 160, downwardly to lubricate bearing 94. This oil then flows downwardly through openings 162, in the torque cone 42, to lubricate the bearing 80. From this point the oil drains back into the sump 154. The illustrated rotary seals between the torque cone 42 and the stub shaft 70 and frame 90 minimize, if not eliminate, escape of oil from its described flow-path in lubricating the bearings 94 and 80 and returning to the sump 154.

The remainder of the oil pumped upwardly passes through the notched flange connection between the upper and lower portions of the shaft 44 to the upper end of that shaft. A portion of this oil passes outwardly through holes 164 and is deflected, by a divergent extension of the flanged sleeve 73, toward the bearing 92. It will also be seen that this sleeve extension prevents oil from entering the cavity defined by the rotor shell 75.

The lubricating oil for bearing 92 as well as a further quantity of oil passing through holes 166, above the bearing 92, then passes outwardly through a hollow vane or vanes 46 of the torque ring 45. To prevent leakage of oil between the torque ring 45 and the high speed rotor 36 a labyrinth seal is provided. This seal comprises teeth 168 closely spaced from a cylindrical surface of the nut 98. Passageways 170 extend from the roots of the teeth 168 to the interiors of the hollow vanes 46 so that any oil passing the first or second tooth will be directed, by centrifugal force into the hollow vanes 46.

The oil forced outwardly through the hollow vanes 46 passes through openings in the outer torque ring shroud 50 to an axial passageway(s) 172 formed in the rim portion 55 of the shell 54. This oil then passes through openings 174 in the retainer 84 and is deflected by a lip thereon to lubricate the bearing 78. This lubricating oil may pass on opposite sides of the frame 86 to a collection area defined by the frame 86 and the disc 130. Holes 176 are provided in the frame 86 to facilitate oil flow to the collection area. From this collection area the oil is drained, by gravity, back to the sump 154. A conduit 178 is provided for this purpose, extending, as diagrammatically indicated, to and through a turbine outlet guide vane 95 and then to the sump 154. It will be noted that the vented seal 132 minimizes the possibility of the area around the bearing 78 being pressurized and blowing oil therefrom into the fan duct. The oil is also cooled in flowing through the passageways 172 and conduit 178.

The described engine uniquely combines several features which contribute to its short axial length while providing high performance levels necessary for aircraft propulsion and V/STOL propulsion in particular. The toroidal combustion is one key feature in that it reduces overall combustor length while at the same time providing for a turbine flow-path of maximum diameter. The constant pitch axial flow compressor being telescoped into the toroidal combustor with its annular diffuser discharging outwardly therein is also a cooperative feature. Likewise, the counter-rotating compressor and its manner of fabrication and journaling are significant factors in the preferred, overall combination. Similarly other features as the compressor bleed system, the lubrication system and start system are uniquely incorporated in the preferred combination to obtain the stated objects of the invention. The latter two features have in common the elimination of power take-off shafting from the engine rotor or rotors which is normally employed and which would otherwise increase the problems of obtaining minimum axial length. Certain of these features additionally have utility in other engine embodiments, within the scope of the present inventive concepts, as will be apparent from the claims appended to the present specification as well as the following description of another embodiment of the invention found in FIGS. 2 and 7.

Referencing FIG. 2, engine 200 is similar in many respects to the engine 10 previously described and components thereof which are identical or essentially identical with those of engine 10 will be identified with like reference characters. Briefly, engine 200 is also of the fan type wherein a relatively low energy, high mass flow airstream is pressurized by a fan 12 and discharged from an annular nozzle 14 to provide a propulsive force. The nozzle 14 is formed at the downstream ends of an outer casing 16 and an inner housing 18. The inner housing 18 is connected to and supported from the outer casing 16 by struts 19 which function as outlet guide vanes for the fan 12. A core engine or gas generator 220 within the housing 18 generates a high energy hot gas stream which powers the fan 12 and generates a further propulsive force by being discharged from a nozzle 22 at the downstream end of the housing 18.

The casing 16 may, as before, be provided with trunnions 24 so that the engine can be pivoted relative to the airframe of the aircraft, thus the engine's thrust may be vectored in transitioning between vertical and horizontal flight modes.

The gas generator 220 comprise an axi-centrifugal, high pressure compressor 226 which pressurizes air to support combustion of fuel in a combustion chamber 228 which has been modified to receive pressurized air from this compressor. The hot gas stream thus generated then drives a high pressure turbine 30 and a low pressure turbine 32 before being discharged from the nozzle 22. The turbines 30 and 32 power the high pressure compressor 226 and fan 12 as will later appear.

Referencing FIG. 7, it will be seen that the components of the high pressure turbine 30 and low pressure turbine 32 of engine 200 are identical with the corresponding turbines of the previously described engine 10, cf. FIG. 3 and therefore individual components thereof are not identified by specific reference characters except as may be required to describe their relationship to the present embodiment.

The rotating portion of the turbine 30 forms part of a high speed rotor 236 which further includes a compressor portion. This compressor portion includes a drum 400 having a circumferential row of blades 76 projecting therefrom. The drum is connected to a rotor element 402 having a circumferential row of blades 404 mounted thereon. The rotor element 402 also has integral, outwardly curved centrifugal compressor impeller blades 406 formed thereon. The rotor element 402 is secured to a turbine disc 66 by a flanged sleeve 73 in the same fashion as the compressor cone 72 was secured to the disc 66 in FIG. 3.

The rotating portion of the low speed rotor 234 again includes an inner shaft 44 connected at its upstream end to a shell 254 by a torque ring 45. The primary difference in the shell 254 is that it is shorter and carries only a single row of inwardly projecting blades 64. The rim portion 55, for attachment of fan blades 60, is almost coextensive with the length of the shell 254. The blades 64 are also integral with shroud sectors 81 and held in assembled relation on the shell 254 by the outer shroud 50 of the torque ring 45.

A casing 408 is spaced from the shell 254 and curves outward, in close proximity to the blades 404 and impellers 406, to a radial flow diffuser 410. Pressurized air from the diffuser 410 discharges into an annular chamber 412 formed in a frame member 414. The frame member 414 corresponds in many respects to the frame member 105 of the previous embodiment.

The combustion chamber 228 differs from the chamber 28 previously described only in the manner in which air is introduced and distributed therein. The remaining features and structure remain the same and, accordingly, will not be described further.

Holes 416 connect the frame chamber 412 with an annular passageway between a combustor casing 418 and the outer combustor liner 107. Pressurized air may thus flow to this annular passageway with a portion thereof flowing outwardly along the outer surface of the liner 107 to the inlet end of the combustion zone (at the fuel injectors 110) while the remainder of the air flows inwardly along the liner 107 to the lower end of the nozzle diaphragm 109. This air then flows through the hollow vanes of the nozzle diaphragm to the inlet end of the combustion zone. The flow passages are proportioned to obtain the described split of the pressurized air in flowing to the inlet end of the combustion zone.

A bleed system for engine operation at off-design conditions is also provided, using many elements previously described. The primary difference is in the bleed 420 which is defined by the casing 408, one of the walls of the diffuser 410 and the annular member 130. Only the single pair of rotary fluid seals 132 is required for this chamber. The gap between the shell 254 and casing 408 permits interstage air to flow into this chamber. Bleeding of air from this chamber into the fan duct is selectively controlled by actuators 144 operating the valve mechanism previously described.

The rotors 234, 236 are journaled by bearings 78, 80, 92 and 94 in the same fashion as in the previous embodiment. Likewise, the lubrication and starting functions find such commonality.

Having thus described the invention what is claimed as novel and desired to be secured by Letters Patent of the United States is:

1. A gas turbine engine comprising:
    a casing,
    an inner housing spaced from said casing and defining in combination therewith an annular fan duct,
    fan blading for pressurizing air in said fan duct, and a core engine, within said inner housing, which includes, in series flow relationship,
    compressor means,
    a generally toroidal combustion chamber having spaced inner and outer annular liners defining a combustion zone in which a hot gas stream is generated, said liners being curved from a forward facing, fuel/air entrance end, forwardly, inwardly and rearwardly through approximately 180°, said liners further being spaced from the walls of the combustion chamber to provide for flow of air therealong to the inlet end,
    a turbine nozzle diaphragm connected to the inner ends of the liners and including a plurality of radially extending airfoil type vanes with passageways therethrough from one end of each vane to the other end thereof wherein a hot gas stream from said combustion chamber discharges between said vanes,
    means for directing at least a portion of the air from the compressor through said nozzle vanes and into the inlet end of the combustion zone;
    and turbine means, driven by the hot gas stream, for powering said compressor and fan blading.

2. A gas turbine engine as in claim 1 wherein
    the turbine means are axial flow turbine means having a flow-path, the outer bounds of which increase in diameter from said diaphragm at a relatively rapid rate to a maximum diameter approaching the maximum diameter of the toroidal combustion chamber.

3. A gas turbine engine as in claim 1 wherein the core engine includes
    a first rotor having a bladed turbine portion forming part of the turbine means and a bladed compressor portion forming part of the compressor means and
    a second rotor having, as a part of the turbine means, a bladed turbine portion adapted to rotate the second rotor in the direction opposite that of the first rotor and a shell having inwardly projecting blades also forming part of said compressor means and
    further wherein
    the fan blading is attached to and projects outwardly from said second rotor shell.

4. A gas turbine engine as in claim 3 wherein
    the turbine means includes a circumferential row of outlet guide vanes mounted on said inner housing
    an inner frame is structurally connected to said inner housing through said outlet guide vanes
    a bearing journals the outer diameter of said second rotor shell on the inner housing,
    a second bearing journals the downstream end of said second rotor on said inner frame, and
    axially spaced bearings journal the first rotor on the second rotor.

5. A gas turbine engine as in claim 4 wherein
    the second rotor shell has a rim portion at its upstream end with means thereon for mounting said fan blading and
    the bearing journaling said shell is a ball bearing disposed immediately downstream of said rim portion and
    the bearing journaling the downstream end of said second rotor is a roller bearing.

6. A gas turbine engine as in claim 5 wherein
    the second rotor includes an inner shaft connected at its downstream end to the turbine portion thereof and a bladed torque ring connecting the upstream end of said shaft to the upstream end of said shell, and
    the bearings journaling the first rotor are disposed at its opposite ends and are mounted on said inner shaft with the upstream bearing being a ball bearing and the downstream bearing being a roller bearing.

7. A gas turbine engine comprising
    a housing
    compressor means within said housing for pressurizing air
    a combustor for generating a hot gas stream by burning fuel in the air pressurized by said compressor means
    axial flow turbine means for powering the compressor means
    a first rotor including a bladed turbine portion forming part of the turbine means and a compressor portion with outwardly projecting blades forming a part of the compressor means and
    a second rotor having a bladed turbine portion also forming a part of the turbine means downstream of the bladed turbine portion of the first rotor and a shell having inwardly projecting blades also forming a part of said compressor means
    a bearing journaling the downstream end of the second rotor on said housing,
    a bearing journaling the outer diameter of the second rotor shell on said housing and
    axially spaced bearings journaling the first rotor on said second rotor.

8. A gas turbine engine as in claim 7 wherein the turbine means comprises a circumferential row of outlet guide vanes mounted on said housing adapted to rotate the second rotor in the direction opposite that of the first rotor and disposed downstream of the turbine portion of the second rotor and an inner frame is structurally connected to said housing through said outlet guide vanes and supports the bearing journaling the downstream end of said second rotor.

9. A gas turbine engine as in claim 8 further comprising an outer casing spaced from said housing and defining, in combination therewith, a fan duct, and fan blading for pressurizing air in said duct and further wherein the second rotor shell has a rim portion at its upstream end with means thereon for mounting said fan blading, the bearing journaling said shell is a ball bearing disposed immediately downstream of said rim portion and the bearing journaling the downstream end of said second rotor is a roller bearing.

10. A gas turbine engine as in claim 8 wherein the second rotor includes an inner shaft connected at its downstream end to the turbine portion thereof and a bladed torque ring connecting the upstream end of said shaft to the upstream end of said shell and the bearings journaling the first rotor are disposed at its opposite ends and are mounted on said inner shaft with the upstream bearing being a ball bearing and the downstream bearing being a roller bearing.

11. A gas turbine engine as in claim 3 wherein the inwardly projecting blades are disposed in circumferential rows the lower speed rotor shell is circumferentially integral for maximum strength and the blade rows each comprise outer shroud sectors of no more than about 180° from which blades project inwardly, said sectors being telescoped within said shell whereby the sectors may be assembled on the bladed compressor portion of the first rotor and the second rotor shell then assembled relative to said blade rows.

12. A gas turbine engine as in claim 11 wherein said shell decreases in diameter in a downstream direction the turbine portions of said rotors have a diameter greater than the smallest diameter of said shell and are separably secured to the compressor portions thereof whereby the compressor portions of the rotors may be first assembled and then the turbine portions secured thereto.

13. A gas turbine engine as in claim 12 wherein the sectors of the downstreammost row of blades is positioned by abutment means, and the outer shroud portions of adjacent inwardly projecting blade rows engage each other and space said blade rows axially to receive the outwardly projecting blade rows of the first rotor therebetween, the second rotor includes an inner shaft connected at its downstream end to the turbine portion thereof and a bladed torque ring connecting the upstream end of said inner shaft to the upstream end of said shell, said torque including an integral outer shroud telescoped into said shell and engaging the outer shroud portions of the adjacent blade sectors, and means separably securing said outer torque ring shroud to said shell whereby the inwardly projecting blades may be held in assembled relation on said shell.

14. A gas turbine engine comprising first and second rotors respectively having axial flow compressor portions and turbine portions adapted to rotate the rotors in opposite directions said first rotor having at least one circumferential row of outwardly projecting blades said second rotor having a circumferentially integral shell surrounding said blade row and a circumferential row of blades projecting inwardly from said shell downstream of said first rotor blade row, said second rotor blade row comprising outer shroud sectors, of no more than about 180°, from which the blades project inwardly, said sectors being telescoped within said shell, first rotor and the shell then assembled relative to the blade rows, said second rotor also comprising an inner shaft extending upstream from its turbine portion and a torque ring connecting the upstream end of said inner shaft and the upstream end of said shell, said torque ring comprising inner and outer shrouds interconnected by integral vanes disposed upstream of the first rotor blade row, said torque ring shroud also being telescoped within said shell and clamped thereto in abutting relation with said shroud sectors.

15. A gas turbine engine as in claim 14 wherein said shell decreases in diameter in a downstream direction and the turbine portions of the first and second rotors are of the axial flow type having diameters larger than the smallest diameter of said shell and are separably connected respectively to their compressor portions, thereby permitting assembly of the turbine portions subsequent to assembly of the shell.

16. A gas turbine engine as in claim 4 which is adapted for vertical propulsion with the engine inlet at its upper end and its axis generally vertically disposed and further comprising an oil reservoir mounted on said inner frame and further wherein said second rotor includes an inner hollow shaft extending from within said reservoir to the upper end of the second rotor, the inner surface of said hollow shaft portion being divergently tapered upwardly whereby oil will be pumped, by the centrifugal force of rotation, from the reservoir to the upper end of the second rotor and passageway means to direct oil from said inner shaft to said bearings and then back to said reservoir.

17. A gas turbine engine as in claim 16 wherein said second rotor includes a vaned torque ring connecting the upper end of said shaft and the upper end of said shell and the passageway means include passageways through said vanes to said bearing journaling said shell.

18. A gas turbine engine as in claim 17 wherein
the first rotor includes stub shafts at its opposite ends,
the bearings journaling same are provided at said stub shafts,
the passageway means include holes through said inner shaft above and below the upper first shaft bearing,
said first rotor has an upwardly divergent sleeve spaced from and directing oil toward the upper bearing and the vane passageways,
said sleeve continuing downwardly through a cylindrical portion to the lower first rotor bearing, and
said oil passageway means includes a hole through said shaft directed toward said cylindrical sleeve portion above the lower first rotor bearing to lubricate and pass oil downwardly toward the lower second rotor bearing.

19. A gas turbine engine as in claim 18 wherein
the torque ring includes an inner shroud spaced concentrically from the upper stub shaft of the first rotor
labyrinth teeth project inwardly from said inner shroud to close proximity with said upper stub shaft forming a rotating fluid seal,
and passageways extend from the crotches of said teeth to the vane passages to minimize leakage of oil.

20. A gas turbine engine for the generation of vertical thrust, said engine having
a reservoir centrally disposed at its lower end,
a vertically disposed rotor with a shaft portion extending substantially through its length, said shaft portion being hollow with its inner surface divergently tapered upwardly from said reservoir shaft whereby oil will be pumped, by the centrifugal force of rotation, from said reservoir to the upper end of said shaft wherein the rotor also has a turbine portion at its lower end, a vaned torque ring connected to its upper end, and a shell connected at its upper end to the torque ring outwardly of said vanes,
bearing means for journaling the opposite ends of said rotor wherein the bearing means include an upper bearing journaling the outer diameter of said shell and a lower bearing journaling said shaft, and
passageway means for directing oil from the interior of said shaft portion to said bearing means and back to said reservoir wherein the passageway means include passages through said vanes to said upper bearing.

21. A gas turbine engine as in claim 20 wherein
the torque ring includes an inner shroud and
a rotating fluid seal is provided with said inner shroud comprising labyrinth teeth projecting inwardly therefrom and
passageways extend outwardly from the crotches of said labyrinth teeth to said vane passages to minimize leakage of oil through said seal.

22. A gas turbine engine as in claim 20 wherein
the rotor shell has axially spaced rows of inwardly projecting blades forming a compressor portion thereof another rotor is provided, having outwardly projecting blades, cooperative with the inwardly projecting blades, forming a compressor portion thereof, said other rotor also having a turbine portion upstream of the turbine portion of the first mentioned rotor,
said other rotor also having stub shafts at its opposite ends
bearings for journaling said stub shafts on said inner shaft,
a sleeve extending between said stub shaft bearings concentrically of and spaced from said inner shaft
said passageway means including holes through said inner shaft above and below said upper stub shaft bearing, the upper portion of said sleeve being divergently tapered to assure flow of oil toward said upper stub shaft bearing and said vane passages
said passageway means further including a hole through said inner shaft which is directed toward said sleeve below the upwardly divergent portion thereof whereby oil passes downwardly to and through the lower stub shaft bearing, to and through the lower bearing for the first mentioned shaft and then to said sump under the influence of gravity.

23. A gas turbine engine as in claim 3 wherein
the second rotor comprises an inner shaft extending upstream of its turbine portion, and a vaned torque ring connecting the upstream ends of the inner shaft and the shell, the vanes of the torque ring and the inwardly projecting blades of the shell forming axial flow compressor stages
the compressor portion of the first rotor comprises a circumferential row of outwardly projecting blades disposed between said vanes and said inwardly projecting blade row to form a further axial flow compressor stage and also comprises a centrifugal flow, bladed impeller which receives air from the axial flow stages and further compresses same as it is directed radially outwardly,
said inner housing includes an annular compressor casing cooperative with said centrifugal impeller to define the outer bounds of the flow-path therethrough, the inlet end of said compressor casing being aligned with and spaced from the downstream end of said second rotor shell,
said casing further including a radial flow diffuser disposed adjacent to said toroidal combustion chamber and having a discharge diameter approaching the maximum diameter of said combustion chamber.

24. A gas turbine engine as in claim 23 wherein
an annular wall, in combination with the compressor casing, defines a bleed chamber into which pressurized air may flow from through the space between said shell and said compressor casing and
further including means for selectively bleeding air from said bleed chamber to a lower pressure to prevent stall during off-design operation of the engine.

25. A gas turbine engine as in claim 23 wherein
the turbine means are of the axial flow type, the outer bounds of which increase in diameter, from said diaphragm, at a relatively rapid rate to a maximum diameter approaching the maximum diameter of the toroidal combustion chamber.

26. A gas turbine engine as in claim 23 wherein a member of said housing is spaced from the portion of the combustion chamber casing and provides a starting air passageway leading to said nozzle diaphragm the outer shroud of said nozzle diaphragm has connecting passageways directed toward said turbine means, and means for introducing pressurized air, from an external source, to said starting air passageway whereby starting air will be directed toward the turbine means in initiating operation of the engine.

27. A gas turbine engine as in claim 3 wherein the compressor portions of the first and second rotors jointly form a multistage axial flow compressor and further including an annular diffuser for said compressor, said diffuser being outwardly curved and opening into said combustion chamber intermediate its axial length.

28. A gas turbine engine as in claim 27 wherein the multistage axial flow compressor has an essentially constant pitch throughout its length.

29. A gas turbine engine as in claim 28 wherein the turbine means are of the axial flow type, the outer bounds of which increase in diameter, from said diaphragm, at a relatively rapid rate to a maximum diameter approaching the maximum diameter of the toroidal combustion chamber.

30. A gas turbine engine as in claim 27 wherein the vanes of said nozzle diaphragm have lengthwise passages therethrough the diffuser discharge is generally radially aligned with said diaphragm vanes whereby a portion of the compressor discharge air flows through said vanes to the combustion zone inlet and an annular splitter in said diffuser discharge directs a portion of the compressor discharge air along said outer liner to the combustion zone inlet.

31. A gas turbine engine as in claim 27 wherein the second rotor comprises an inner shaft extending upstream from the turbine portion thereof and a torque ring having inner and outer shrouds interconnected by integral vanes, the inner shroud being connected to the upstream end of said inner shaft and the outer shroud being connected to said shell and said shell has a rim portion at its upstream end having means for attaching the fan blading thereto said inner housing having its upstream end closely spaced from said fan blading.

32. A gas turbine engine as in claim 31 wherein the vanes of said torque ring are leaned tangentially to minimize bending stresses therein.

33. A gas turbine engine comprising a rotor having a turbine portion, a shaft extending upstream therefrom and a compressor portion said compressor portion including a concentric shell spaced outwardly from said shaft, a vaned torque ring having inner and outer shrouds interconnected by integral vanes, the inner shroud being connected to the upstream end of said shaft and the outer shroud being connected to said shell characterized in that the torque ring vanes are leaned tangentially to minimize bending stresses therein.

34. A gas turbine engine as in claim 33 wherein the torque ring vanes are leaned, from the inner shroud, away from the direction of rotor rotation thereby stressing the vanes primarily in tension.

35. A gas turbine engine as in claim 34 wherein the shell has fan blading projecting outwardly therefrom and a plurality of rows of compressor blades projecting inwardly therefrom.

36. A gas turbine engine as in claim 31 wherein a chamber within said inner housing surrounds a portion of the axial length of said shell passageway means extend from the interior of said shell, at an intermediate compressor stage to said chamber, rotary fluid sealing means are provided between said chamber and said shell, the downstream sealing means having on one side compressor discharge pressure and on the other side intermediate stage pressure and means for venting an intermediate portion of the downstream sealing means to the fan duct to isolate the said chamber and intermediate compressor stage from compressor discharge pressure and means for selectively bleeding air from said chamber to said fan duct to prevent stall during off-design operation of the engine.

37. A gas turbine engine including a counter-rotating compressor having a first rotor with circumferential, axially spaced rows of outwardly projecting blades and a second rotor in the form of a shell with circumferential rows of blades projecting inwardly between the first rotor blade rows, thereby forming a multistage compressor, a housing surrounding said shell and including means defining the annular flow-path of pressurized air discharged from the compressor at the downstream end of said shell said housing including a chamber surrounding an axial length of said shell with rotary fluid sealing means between the housing and shell at opposite ends of said chamber, passageway means extending from the interior of said shell, at an intermediate compressor stage, to said chamber whereby the pressure across said downstream sealing means is compressor discharge pressure and said intermediate stage pressure means for venting an intermediate portion of said downstream sealing means to a substantially lower pressure to isolate said chamber and intermediate compressor stage from compressor discharge pressure and means for selectively bleeding air from said chamber to a substantially lower pressure to prevent stall during off-design operation of the engine.

38. A gas turbine engine comprising:

a casing;

an inner housing spaced from said casing and defining in combination therewith an annular fan duct;

fan blading for pressurizing air in said fan duct, and a core engine, within said inner housing, which includes:

a compressor means, a combustion chamber and a turbine means in serial flow relationship such that the turbine means is driven by the hot gas steam from the combustion chamber and in turn drives said compressor and fan blading;

a first rotor having a bladed turbine portion forming part of the turbine means and a bladed compressor portion forming part of the compressor means;

a second rotor having, as a part of the turbine means, a bladed turbine portion adapted to rotate the second rotor in the direction opposite that of the first rotor, and a circumferentially integral shell forming part of the compressor portion and having inwardly projecting blades disposed in circumferential rows wherein the blade rows each comprise outer shroud sectors of no more than 180° from which blades project inwardly whereby the outer shroud portions of adjacent inwardly projecting blade rows engage each other and space said blade rows axially to receive the outwardly projecting blade rows of the first rotor therebetween for assembly of the sectors on the bladed compressor portion of the first rotor, and whereby said second rotor shell may be assembled relative to said blade rows by telescoping said sectors within said shell such that sectors of the downstream-most row of blades are positioned within the shell by abutment means, and wherein the second rotor also includes an inner shaft connected at its downstream end to the turbine portion thereof and a bladed torque ring connecting the upstream end of said inner shaft to the upstream end of said shell, said torque ring including an integral outer shroud telescoped into said shell and engaging the outer shroud portions of the adjacent blade sectors and means separately securing said outer torque ring shroud to said shell whereby the inwardly projecting blades may be held in assembled relation on said shell and wherein said fan blading is attached to and projects outwardly from said second rotor shell.

39. The gas turbine engine as in claim 38 wherein the turbine portions of said rotors have a diameter greater than the smallest diameter of said shell and are separately secured to the compressor portions thereof whereby the compressor portions of the rotors may be first assembled and then the turbine portions secured thereto.

* * * * *